(12) United States Patent
Vembu et al.

(10) Patent No.: US 8,646,052 B2
(45) Date of Patent: Feb. 4, 2014

(54) METHOD AND APPARATUS FOR PROVIDING A SECURE DISPLAY WINDOW INSIDE THE PRIMARY DISPLAY

(75) Inventors: Balaji Vembu, Folsom, CA (US); Nitin Sarangdhar, Portland, OR (US); Vedvyas Shanbhogue, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1464 days.

(21) Appl. No.: 12/059,972

(22) Filed: Mar. 31, 2008

(65) Prior Publication Data

US 2009/0245521 A1    Oct. 1, 2009

(51) Int. Cl.
*H04L 29/06* (2006.01)

(52) U.S. Cl.
USPC .................................... 726/5; 713/164

(58) Field of Classification Search
USPC .................................... 726/5; 713/164
See application file for complete search history.

(56) References Cited

U.S. PATENT DOCUMENTS

| | | | | |
|---|---|---|---|---|
| 5,537,476 | A * | 7/1996 | Coteus et al. | 380/54 |
| 5,614,920 | A * | 3/1997 | Coteus et al. | 345/7 |
| 5,619,219 | A * | 4/1997 | Coteus et al. | 345/7 |
| 5,881,287 | A * | 3/1999 | Mast | 717/127 |
| 6,535,929 | B1 * | 3/2003 | Provino et al. | 719/321 |
| 6,961,941 | B1 * | 11/2005 | Nelson et al. | 719/319 |
| 7,065,651 | B2 * | 6/2006 | Evans | 713/189 |
| 7,073,070 | B2 * | 7/2006 | Girard | 713/190 |
| 7,181,744 | B2 * | 2/2007 | Shultz et al. | 718/104 |
| 7,197,648 | B2 * | 3/2007 | Evans | 713/189 |
| 7,203,310 | B2 * | 4/2007 | England et al. | 380/200 |
| 7,206,940 | B2 * | 4/2007 | Evans et al. | 713/193 |
| 7,257,811 | B2 * | 8/2007 | Hunt et al. | 718/1 |
| 7,272,726 | B2 * | 9/2007 | Evans | 713/193 |
| 7,284,135 | B2 * | 10/2007 | Evans et al. | 713/192 |
| 7,293,178 | B2 * | 11/2007 | Evans et al. | 713/192 |
| 7,299,365 | B2 * | 11/2007 | Evans | 713/189 |
| 7,302,586 | B2 * | 11/2007 | Evans | 713/189 |
| 7,337,328 | B2 * | 2/2008 | Evans | 713/189 |
| 7,337,329 | B2 * | 2/2008 | Evans | 713/189 |
| 7,346,909 | B1 * | 3/2008 | Eldar et al. | 719/312 |
| 7,380,130 | B2 * | 5/2008 | England et al. | 713/189 |
| 7,421,533 | B2 * | 9/2008 | Zimmer et al. | 711/6 |
| 7,490,324 | B2 * | 2/2009 | Shultz et al. | 718/1 |

(Continued)

OTHER PUBLICATIONS

Office Action received for Chinese Patent Application No. 200910149779.2, mailed on Apr. 25, 2011, 3 pages of English Translation and 4 pages of Office Action.

(Continued)

*Primary Examiner* — David Garcia Cervetti
(74) *Attorney, Agent, or Firm* — Schwabe, Williamson & Wyatt, P.C.

(57) ABSTRACT

In some embodiments, the invention involves securing sensitive data from mal-ware on a computing platform and, more specifically, to utilizing virtualization technology and protected audio video path technologies to prohibit a user environment from directly accessing unencrypted sensitive data. In an embodiment a service operating system (SOS) accesses sensitive data requested by an application running in a user environment virtual machine, or a capability operating system (COS). The SOS application encrypts the sensitive data before passing the data to the COS. The COS makes requests directly to a graphics engine which decrypts the data before displaying the sensitive data on a display monitor. Other embodiments are described and claimed.

15 Claims, 6 Drawing Sheets

(56) References Cited

U.S. PATENT DOCUMENTS

| | | | |
|---|---|---|---|
| 7,600,267 B2* | 10/2009 | Bauchot et al. | 726/33 |
| 7,619,622 B2* | 11/2009 | de Souza et al. | 345/418 |
| 7,620,984 B2* | 11/2009 | Kallahalla et al. | 726/22 |
| 7,631,184 B2* | 12/2009 | Ryan | 713/160 |
| 7,634,664 B2* | 12/2009 | Ibrahim et al. | 713/189 |
| 7,657,759 B2* | 2/2010 | Rubin et al. | 713/193 |
| 7,688,719 B2* | 3/2010 | Rehm | 370/225 |
| 7,689,926 B2* | 3/2010 | de Souza et al. | 715/781 |
| 7,716,377 B2* | 5/2010 | Harris et al. | 709/248 |
| 7,739,417 B2* | 6/2010 | Liu et al. | 710/3 |
| 7,752,436 B2* | 7/2010 | Grobman et al. | 713/164 |
| 7,768,522 B2* | 8/2010 | Stauffer et al. | 345/568 |
| 7,788,713 B2* | 8/2010 | Grobman et al. | 726/12 |
| 7,797,748 B2* | 9/2010 | Zheng et al. | 726/24 |
| 7,802,000 B1* | 9/2010 | Huang et al. | 709/228 |
| 7,870,153 B2* | 1/2011 | Croft et al. | 707/781 |
| 7,900,005 B2* | 3/2011 | Kotsovinos et al. | 711/162 |
| 7,941,539 B2* | 5/2011 | Tripathi et al. | 709/226 |
| 7,949,677 B2* | 5/2011 | Croft et al. | 707/781 |
| 7,954,150 B2* | 5/2011 | Croft et al. | 726/21 |
| 8,010,667 B2* | 8/2011 | Zhang et al. | 709/224 |
| 8,010,679 B2* | 8/2011 | Low et al. | 709/227 |
| 8,051,180 B2* | 11/2011 | Mazzaferri et al. | 709/227 |
| 8,060,876 B2* | 11/2011 | Smith et al. | 718/1 |
| 8,108,641 B2* | 1/2012 | Goss et al. | 711/163 |
| 8,249,257 B2* | 8/2012 | Brutch et al. | 380/279 |
| 8,259,948 B2* | 9/2012 | Smith et al. | 380/277 |
| 8,341,732 B2* | 12/2012 | Croft et al. | 726/21 |
| 2003/0140241 A1* | 7/2003 | England et al. | 713/194 |
| 2003/0200435 A1* | 10/2003 | England et al. | 713/172 |
| 2005/0039180 A1* | 2/2005 | Fultheim et al. | 718/1 |
| 2005/0102671 A1* | 5/2005 | Baumberger | 718/1 |
| 2005/0160424 A1* | 7/2005 | Broussard et al. | 718/1 |
| 2005/0198488 A1* | 9/2005 | Sandland et al. | 713/150 |
| 2005/0210467 A1* | 9/2005 | Zimmer et al. | 718/1 |
| 2005/0237330 A1* | 10/2005 | Stauffer et al. | 345/531 |
| 2005/0268298 A1* | 12/2005 | Hunt et al. | 718/1 |
| 2005/0289540 A1* | 12/2005 | Nguyen et al. | 718/1 |
| 2005/0289648 A1* | 12/2005 | Grobman et al. | 726/12 |
| 2006/0050929 A1* | 3/2006 | Rast et al. | 382/103 |
| 2006/0069828 A1* | 3/2006 | Goldsmith | 710/100 |
| 2006/0155862 A1* | 7/2006 | Kathi et al. | 709/229 |
| 2007/0038997 A1* | 2/2007 | Grobman et al. | 718/1 |
| 2007/0079307 A1* | 4/2007 | Dhawan et al. | 718/1 |
| 2007/0088762 A1* | 4/2007 | Harris et al. | 707/201 |
| 2007/0089111 A1* | 4/2007 | Robinson et al. | 718/1 |
| 2007/0171921 A1* | 7/2007 | Wookey et al. | 370/401 |
| 2007/0174410 A1* | 7/2007 | Croft et al. | 709/208 |
| 2007/0174429 A1* | 7/2007 | Mazzaferri et al. | 709/218 |
| 2007/0179955 A1* | 8/2007 | Croft et al. | 707/9 |
| 2007/0180447 A1* | 8/2007 | Mazzaferri et al. | 718/1 |
| 2007/0180448 A1* | 8/2007 | Low et al. | 718/1 |
| 2007/0180449 A1* | 8/2007 | Croft et al. | 718/1 |
| 2007/0180450 A1* | 8/2007 | Croft et al. | 718/1 |
| 2007/0180493 A1* | 8/2007 | Croft et al. | 726/2 |
| 2007/0186212 A1* | 8/2007 | Mazzaferri et al. | 718/1 |
| 2007/0192329 A1* | 8/2007 | Croft et al. | 707/10 |
| 2007/0198656 A1* | 8/2007 | Mazzaferri et al. | 709/218 |
| 2007/0229505 A1* | 10/2007 | Souza et al. | 345/441 |
| 2007/0234212 A1* | 10/2007 | de Souza et al. | 715/703 |
| 2008/0077917 A1* | 3/2008 | Chen et al. | 718/1 |
| 2008/0215770 A1* | 9/2008 | Liu et al. | 710/30 |
| 2008/0222375 A1* | 9/2008 | Kotsovinos et al. | 711/162 |
| 2008/0244546 A1* | 10/2008 | Schmelter et al. | 717/158 |
| 2008/0297433 A1* | 12/2008 | Heller et al. | 345/2.1 |
| 2009/0037672 A1* | 2/2009 | Colbert et al. | 711/154 |
| 2009/0083734 A1* | 3/2009 | Hotra | 718/1 |
| 2009/0083756 A1* | 3/2009 | Kim et al. | 719/312 |
| 2009/0172331 A1* | 7/2009 | Vembu et al. | 711/163 |
| 2009/0204964 A1* | 8/2009 | Foley et al. | 718/1 |
| 2010/0058335 A1* | 3/2010 | Weber | 718/1 |
| 2010/0146074 A1* | 6/2010 | Srinivasan | 709/218 |
| 2010/0217916 A1* | 8/2010 | Gao et al. | 711/6 |
| 2011/0179136 A1* | 7/2011 | Twitchell, Jr. | 709/217 |
| 2011/0252278 A1* | 10/2011 | Kanno et al. | 714/38.1 |
| 2012/0016956 A1* | 1/2012 | Twitchell | 709/217 |
| 2012/0066681 A1* | 3/2012 | Levy et al. | 718/1 |

OTHER PUBLICATIONS

Office Action issued Dec. 6, 2011 in Chinese Patent Application No. 200910149779.2.

Extended European Search Report, mailed Apr. 12, 2012, from EP Application No. 09250989.2, 5 pages.

Marcus Peinado et al: "NGSCB: A Trusted Open System", Jun. 22, 2004, Information Security and Privacy; [Lecture Notes in Computer Science; LNCS], Springer-Verlag, Berlin/Heidelberg, pp. 86-97.

Garfinkel T: "Terra: a virtual machine-based platform for trusted computing", ACM SOSP. Proceedings of the ACM Symposium on Operating Systemsprinciples; Oct. 22, 2003, pp. 193-206.

Office Action issued Apr. 17, 2012 in Chinese Patent Application No. 200910149779.2 , 4 pages.

* cited by examiner

METHOD AND APPARATUS FOR PROVIDING A SECURE DISPLAY WINDOW INSIDE THE PRIMARY DISPLAY

FIELD OF THE INVENTION

An embodiment of the present invention relates generally to securing sensitive data from mal-ware on a computing platform and, more specifically, to utilizing virualization technology and protected audio video path technologies to prohibit a user environment from directly accessing unencrypted sensitive data.

BACKGROUND INFORMATION

Various mechanisms exist for displaying data or graphics on a video console, or monitor, coupled to a computing device. Computing devices having virtualization technology architecture enable some applications to run in higher or lower privileged virtual machines, or virtual appliances.

Various mechanisms exist for enabling virtualization on a platform. Virtualization Technology (VT) may be implemented in a variety of ways on platforms, for instance, available from Intel Corporation. VT enables hardware based virtualization of operating systems. One platform is implemented such that the architecture is split into two virtualized operating systems: a service operating system (SOS) and a capability operating system (COS). The COS is typically the user environment, and the SOS typically executes operating system (OS) services, and the like. The SOS typically will run at the same privilege level as the COS OS. The SOS may also be called a "virtual appliance." The COS represents the conventional user OS where the user runs applications. The SOS is typically a more constrained/contained partition which is protected against inadvertent software modifications, for instance, via downloads, etc. Hence the SOS is generally considered more secure than the COS. In a VT model having a SOS and COS, the platform may be limited to only one partition beyond the virtual appliance, or SOS, i.e., the COS. The SOS and COS may be the only partitions on this type of architecture. An Intel® vPRO™ Desktop PC supports a virtual appliance based architecture. All of the virtual appliances are secure, isolated virtual machines running on top of a virtual machine monitor (VMM). For performance reasons, the physical graphics driver in the vPRO™ platform runs in the user OS (COS) virtual machine. The virtual appliance sends data to the COS for display. In this type of system, the virtual appliance does not have a secure path to the display output. An approach taken using conventional software virtualization techniques is subject to COS-based mal-ware attacks when the physical graphics driver remains in the COS. Another approach is to achieve higher security by moving the physical graphics driver into the SOS and have all COS apps send graphics data through the SOS for display. In this scenario, all COS applications are subject to the potential performance degradation

BRIEF DESCRIPTION OF THE DRAWINGS

The features and advantages of the present invention will become apparent from the following detailed description of the present invention in which.

DETAILED DESCRIPTION

Figure 1:
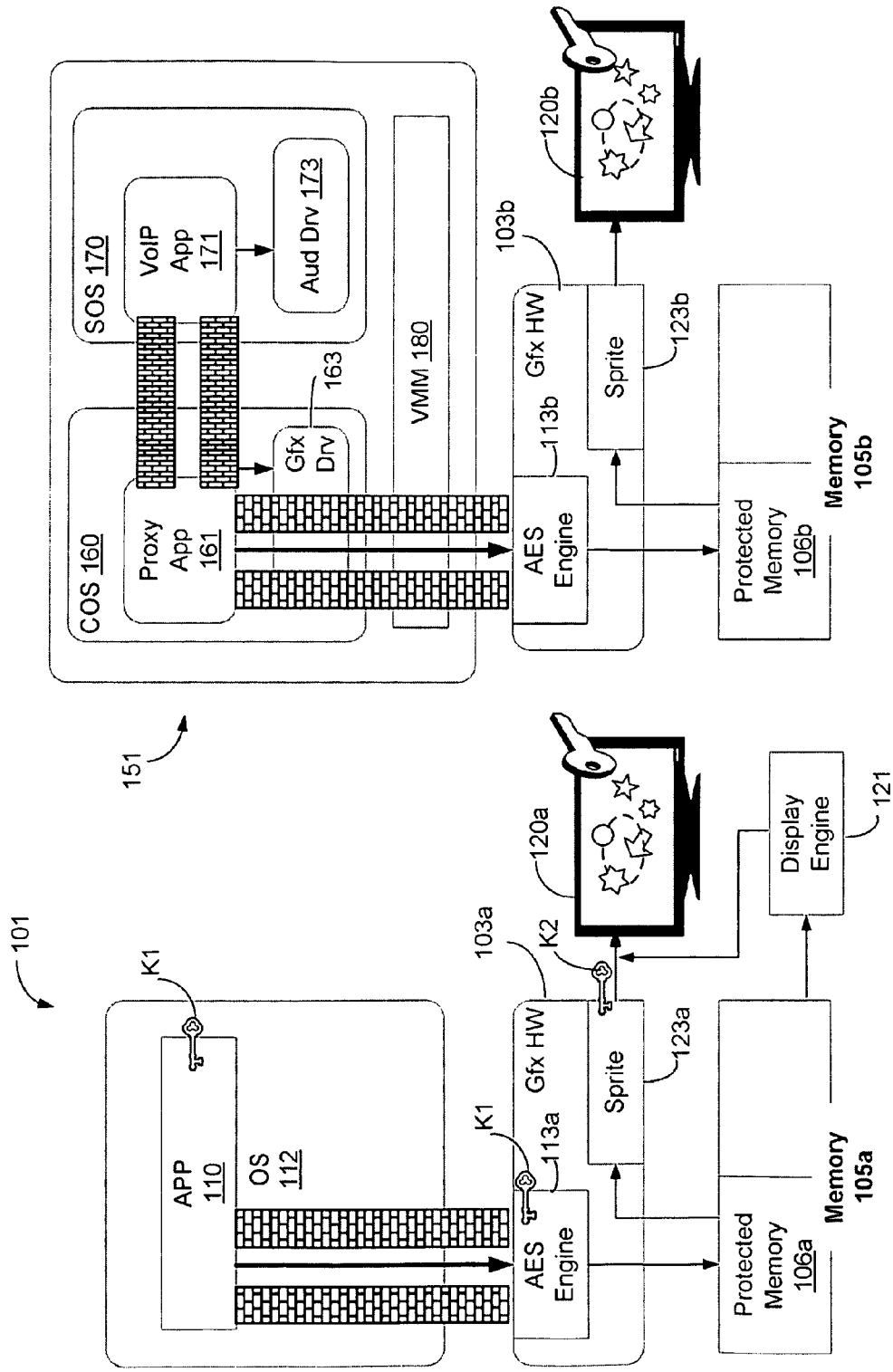
FIG. 1A is a block diagram illustrating a protected audio video path in a platform having a single operating system.
FIG. 1B is a block diagram illustrating a protected audio video path in a platform having virtualization technology (VT), according to an embodiment of the invention.

Embodiments of the invention may find application in a variety of areas where a user desires to view content that is desired to be protected from third parties. For instance, a user may wish to use an Internet browser, for instance, the Internet Explorer® browser available from Microsoft Corp., to transact business with a bank or financial institution. The user has a need for personal and financial information to be protected from third parties or malicious software. Embodiments of the invention enable a user to retrieve encrypted content to be displayed on a portion of a display monitor without the data being available to be intercepted by other software applications, or third parties. While description below uses this scenario as an example to aid illustration of embodiments of the invention, it will be understood that embodiments of the invention may be used to protect other types of sensitive data or content.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

An embodiment of the present invention is a system and method relating to protecting encrypted content stored on a storage device from being transmitted to a display device in an unsecure and open manner. For purposes of this discussion, content is often referred to as "video" content. However, the protected content may contain either or both audio and video content. Video content is intended to be displayed on a video device communicatively coupled to the computing device. However, the protected content may include more than just video portions. In at least one embodiment, the present invention is intended to utilize protected audio video path (PAVP) hardware to protect video content created inside the virtual appliance. In embodiments, a virtual appliance, or service operating system (SOS) sends encrypted content to the graphics engine through the capability operating system (COS). However, since the content passing through COS is encrypted, the content is protected against attacks from within the COS. In order to gain access to the PAVP hardware from the virtual appliance application a proxy application is added in the COS.

In an embodiment, the virtual appliance first encrypts data in the SOS and then simply sends the encrypted data to the COS proxy application. The COS proxy application in turn forwards this encrypted data to the graphics hardware. The decryption engine in the graphics hardware decrypts the data. The clear text data now proceeds through isolated memory to a secure display engine such as a Sprite overlay. Thus, at no point in time is the clear text data visible to the COS based applications. The proxy application in the COS also makes the necessary graphics API (application program interface) calls (i.e., DirectX, OGL) to create an application window and to get the virtual appliance workload scheduled on the graphics engine.

One method to protect data is to run the application retrieving the data in a seperate virtual machine on a platform. Virtual machines (VM) often use separable areas of memory on a common platform where memory available to one VM is unavailable to other VMs. When the application runs under an OS on the platform, this memory may be shared with a multitude of other applications running under the same OS. Any privileged software (Ring-0 drivers) can access all memory and hence can get access to application data. In a contaminated system some of this privileged software may be malicious. Thus, partitioning the application into a separate VM has advantages.

In existing systems, for instance running a Windows® OS available from Microsoft Corp., the OS wants to control the display and communicate directly with the graphics hardware to drive the display output. Thus, the OS drivers and graphics drivers need to have access to content to be displayed on the display console. In existing systems, once the OS has access to the content, all Ring-0 software and other applications running in the same space may have access to the content, including mal-ware.

Embodiments of the invention may utilize Protected Audio Video Path (PAVP) Technology. PAVP technology has been developed generally to provide secure playback of videos on platforms without VT capabilities, i.e., systems with a single OS.

Additional details of PAVP technology may be found in co-pending U.S. patent application Ser. No. 12/006,282, entitled "Securing Content for Playback," filed by Balaji Vembu et al., and filed on 31 Dec. 2007. Additional details regarding key exchanges between the graphics hardware and application may be found in pending U.S. patent application Ser. No. 11/961,848, entitled "Methods For Authenticating A Hardware Device And Providing A Secure Channel To Deliver Data," filed by Balaji Vembu et al., and filed on 20 Dec. 2007.

In an embodiment, the user may select a secure network browser when the user knows data to be retrieved is sensitive and should be protected. The invocation of this secure browser will also initiate a SOS application and SOS PAVP driver to be used in the SOS VM. At this point, the COS is running in the COS VM and the SOS is running in the SOS VM. The VMM is running to control the various virtual machines running on the platform. Under normal operations, the VMM controls time slices used by each of the virtual machines and traps certain events for handling by the VMM or system services running on the SOS.

When the user clicks on a hyperlink or data in the secure browser, the COS application sends this event to the SOS application. The SOS application is responsible for communicating securely with the remote server to retrieve the user data and process it. After processing, the SOS application encrypts the data to be displayed and sends it to the COS proxy application through the SOS graphics driver. The sensitive data is encrypted before the COS application can see, or manipulate the data.

To the user, it appears that the user interface (browser application) running in the user environment (VM) has access to the sensitive data because user input, for instance, a mouse click, operates in the usual way, and requested data appears on the video monitor. However, the user interface environment does not actually see unencrypted data, but only causes the application running on the SOS VM to access the sensitive data and for the graphics engine to decrypt and display the sensitive data. The data remains encrypted until the graphics hardware decrypts it and sends it to the Sprite display engine to be displayed as the interior window.

Referring now to FIG. 1A, there is shown a block diagram illustrating a platform 101 having PAVP hardware. PAVP architecture enables a secure path for data from an application 110 down to the graphics hardware 103a and onto a display monitor 120a. An application first executes a key exchange protocol with the hardware which results in a common shared session key between the application and the hardware. An application 110 running under an operating system (OS) 112 oil the platform 101 may send encrypted data (as illustrated as being protected between two brick walls) to an AES (Advanced Encryption Standard) engine 113a. The AES engine 113a has access to a protected portion of memory 106a in memory store 105a.

A graphics engine 103a is hardware that performs graphics processing tasks independently of the computer's central processing unit(s). A graphics engine may include a graphics coprocessor, a graphics accelerator, a display adapter, or a graphics adapter. The graphics engine 103a may include an encryption engine 113a.

Encrypted content may include any kind of encrypted material, including graphics, video, still pictures, text, games, software, or data. The encrypted information may come in from an application 110 which includes a key for decryption. The incoming data may be stored in a memory 105a within an unprotected memory portion thereof. In one embodiment, a portion of the memory 105a may be associated with a graphics engine. While memory 105a is shown as one memory with protected and unprotected regions, separate memories may also be used. The memory 105a may include an integrated or external memory controller. In one embodiment, the memory 105a is system memory.

As shown in FIG. 1A, the encrypted material is stored on a buffer or surface in memory area 106a. In an embodiment, an encrypted buffer may be stored in unprotected memory 105a. Only a decrypted buffer needs to be stored in protected memory 106a. When the encrypted content is needed, it may be read from the encrypted surface 106a in the memory 105a by an engine in the graphics engine 103a. In one embodiment, the engine 113a may be an encryption/decryption engine. In one embodiment, the engine 113a may implement the Advanced Encryption Standard (AES) developed by the National Institute of Standards and Technology (NIST), Washington, D.C. The engine 113a may be responsible for decrypting the encrypted content using a key, as indicated by the key K1.

However, rather than storing the decrypted information, the engine 113a may pass it on to a renderer engine (not shown) which is part of a graphics engine 103a responsible for processing the content for display.

In the course of rendering graphical information for display, the renderer engine may store various information. It may store information in buffers or within a memory 105a. Memory in 105a may be protected against access by any entity other than an authorized entity. While the renderer stores the information on the surfaces in an unencrypted fashion, hardware, in the form of the renderer engine, prevents access to the information by non-graphics engine hardware.

The memory in 105a may be "stolen" by the basic input/output system (BIOS). As used herein, "stolen memory" describes memory that is not available to the operating system. It may include buffers that are in use for sorting or for hashing operations, such as query work space memory or for those buffers that are being used as generic memory stores for allocations to store internal data structures, such as locks, transaction context, and connection information. Stolen memory is not identified to the operating system. As a result, the operating system and applications running on the operating system have no way to access the stolen memory. Instead, only components of the graphics engine 103a are allowed to access the stolen memory using a graphics engine driver.

In another embodiment, portions of memory in memory 105a may also be protected by a page table based protection where the page table is manipulated by a trusted entity other than the operating system. Other forms of protected memory could also be used.

Initially, the application 110 authenticates the graphics engine hardware of the computer system 101 and exchanges the session key with that hardware. Once the session is set up, the application 110 encrypts the data before sending it to the hardware. Once the session is set, the application 110 then outputs the encrypted data to regular unprotected memory 105a.

The engine, which is part of the graphics engine 103a, reads data from the unprotected memory 105a and decrypts and writes out the result into protected memory. The protected memory is enforced by the hardware. Only graphics engine hardware, such as the engine, renderer engine, or the sprite or overlay engine 123a, can access the stolen memory. The graphics hardware does not allow decrypted data to be written to unprotected memory.

During hardware processing of the protected information, the data resides in the protected memory. The protected memory is created at boot time by the system basic input/output system (BIOS) which sets aside memory, called stolen memory, to locate the intermediate buffers. Once the BIOS allocates this protected memory and stores the parameters of the protected memory in hardware registers, the registers are locked to prevent access to data by manipulating protected memory boundaries. The graphics engine driver allocates surfaces in protected memory when playing back protected content. These surfaces or butters are called protected surfaces. The hardware has specific mechanisms to ensure the protected memory is not accessible to any software running on the system 101 or to non-graphics hardware devices. The Application will ensure that protected memory is setup correctly before delivering content to the hardware.

The graphics engine hardware 103a also has a protected mode of execution that ensures that no graphics operation can cause the data from protected memory to be copied into unprotected memory. This mode allows protection of the data during hardware processing, without having to check the graphics commands or operations submitted by software. Otherwise, a software driver may have been compromised and might attempt to get the protected data.

Note that a display surface cannot be accessed by the compositing agent in one embodiment. Composition is a software component on operating systems. Composition controls how different display windows, the user is using, get merged into the final display. Composition allocates buffers for the various images and then merges them and points hardware to the merged image. One example of a compositing agent is Aero composition on Microsoft® Vista™ operating systems.

The compositing agent runs on the computer's central processing unit, not the graphics engine. Therefore, it is prevented from accessing protected memory in memory 105a. However, the compositing agent can direct the graphics hardware to perform composition on its behalf by pointing to the buffers to be merged and providing a destination buffer for the composited image.

In other embodiments, with trusted compositing, a display engine 121 could be used for all the data display. In trusted compositing, the composition agent can, however, direct the graphics engine to composite the buffers together to produce the resulting screen buffer that can be displayed using the regular display engine.

Instead, the graphics engine hardware 103a may use a Sprite or overlay engine 123a to output graphics engine data for display. The display 120a displays the combined data from the display engine and the Sprite overlay engine 123a. As a result, there is no need for a compositing agent to access the stolen memory.

The compositing agent may feed a display engine 121. The output from the display engine 121 is combined with the output from the sprite or overlay engine 123a to provide a display on the display 120a. The video from the stolen memory may bypass the compositing agent and go directly to the overlay engine, in one embodiment. Content protection may be provided between a combiner and the display 120a, as indicated by the key K2.

A non-protected context may enable writes to be directed anywhere. Thus, anything in the unprotected memory may be written anywhere. In order to transition to protected context from non-protected context, the graphics engine driver may insert a command in a command buffer to get the graphics engine hardware into the protected context mode. In the protected context mode, reads may be from protected or unprotected surfaces. Writes must go only to protected surfaces. In one embodiment, the limitation on writes may be implemented by a memory controller associated with the memory. In order to return to non-protected mode, the graphics engine hardware may execute a cleanup command to get out of protected context mode.

The cleanup command erases any protected information that may have been temporarily stored in graphics engine hardware, such as the renderer engine. This prevents accessing temporary data no longer being used in the graphics engine hardware after the hardware has transitioned to the non-protected context.

The display hardware may use new hooks to be able to read out of protected memory. The architecture may provide a mechanism for the application 110 to specify which of the display planes are allowed to access protected memory. Typical display engines have a number of displayed planes that can generate memory accesses and send data out through the display pipe.

In accordance with some embodiments, an infrastructure for secure playback of content provides a mechanism for an application to securely authenticate the graphics engine before sending data to the graphics engine. It may also provide a secure encrypted channel for the application to send data to hardware. In some embodiments, data may be protected during hardware processing because intermediate buffers are inaccessible to any software running on the computer and to any hardware devices other than graphics engine devices.

In an embodiment, a protect mode may be implemented in hardware in one embodiment. However, software and firmware implementations may also be considered. When implemented in software or firmware, instructions may be stored on a computer readable medium such as a semiconductor memory. Initially, a graphics engine driver inserts a command to place graphics hardware into the protected context. Once in the protect mode, it is determined whether a write is to a protected surface. If not, the write is blocked. Otherwise, a write is executed. A read from a protected or unprotected surface may be executed.

It is determined whether there is a request to exit the protected context. If not, the flow iterates to find more writes and reads to execute. If so, a graphics engine cleanup command is executed. It is then determined if there is a read to protected memory. At this point, the read may be blocked by the graphics hardware before exiting the protected context.

Thus, applications accessing on the operating system do not access the protected memory, which memory is unknown to the operating system. Other components may only seek to access protected memory via its memory controller that blocks accesses by non-graphics engine hardware.

In a typical system, graphics hardware 103*a* operates on data to be displayed and stores the data in memory. The data to be displayed is retrieved from memory 105*a* by a display engine and then displayed on the display monitor 120*a*. In the illustration, a Sprite overlay 123*a* is a display engine for retrieving data from memory and displaying the data on a portion of the display monitor 120*a*. The Sprite overlay 123*a* can display a small window on top of the normal window seen on the display monitor 120*a*. Thus, there are at least two memory buffers. A first buffer contains the information for displaying the first window, herein the "exterior window," and the second buffer contains information for displaying information within the first window, herein referred to as the "interior" window. The image ultimately displayed on the display monitor 120*a* is a combination of information held in both buffers. In embodiments, the Sprite display engine 123*a* has access to the information for the interior window. For instance, older movie players use the Sprite display engine to display movie, or video information, within the exterior window, in an interior window. It will be understood that the interior window may actually be displayed in the entire display, for instance, in full screen mode.

During normal user operation, many windows may appear on the display monitor. However, only some of them, if any, may contain protected content, or sensitive information. In this scenario, the first buffer may contain all of the unprotected content to be displayed, for instance, e-mail programs, word processor programs and data, etc. A second memory buffer may contain sensitive information retrieved over a network, for instance the Internet. For purposes of illustration, sensitive data is described herein as the user's financial data, retrieved from a financial institution over the network. It will be understood that various kinds of sensitive data may be protected using embodiments of the invention. Because the user's account information and balance are sensitive, they are to be stored in the second memory buffer, as to be displayed by the financial institution. This second memory buffer may be protected so that only the Sprite engine has access to it.

An encryption/decryption key exchange may be made between processor-based software application 110 and the graphics hardware 103*a*. A decryption engine 113*a* in the graphics hardware 103*a* is used to decrypt the encrypted, protected data. A secure Sprite overlay 123*a* may be used to display the video pipeline output directly on the display 120*a*. The application 110 encrypts the data before storing it in memory. In this way, the protected data resides as encrypted data within the secure memory portion 106*a*. Other software applications running under the OS will not have access to tie unencrypted data. The data will be decrypted by the graphics hardware in order to display the data on the monitor 120*a*.

To more clearly illustrate how the methods of the invention are used in a real world scenario, the following description focuses on using methods to authenticate a hardware device and to set up a secure channel between a software application and the hardware device. The software application functions as the source device and the hardware application functions as the sink device. Although this is the focus of the description below, it should be noted that the invention is not limited to a software source device nor is it limited to a hardware sink device.

Exemplary embodiments are described herein, where the hardware device consists of a video processing device and the software application serves to deliver audio and video data to the video processing device. The methods of the invention ensure that the audio/video data is delivered in a secure and protected manner. For one embodiment, as described below, a secret encryption key permanently resides in the video processing device, or graphics hardware, the application key is provided to a software vendor who generates the software application, and the random session key is generated by the software application.

In accordance with implementations of the invention, a secret encryption key is permanently embedded in a hardware device, such as a video processing device, or graphics device 103*a*. In some implementations, the video processing device may consist of one or a collection of integrated circuit devices embedded on the main motherboard of a computer. In other implementations, the video processing device may consist of a graphics card that is separate from but electrically coupled to a computer motherboard. In various implementations, the graphics card may be coupled to the computer motherboard by way of an accelerated graphics port (AGP), a peripheral component interface (PCI) slot, a PCI Express slot, or other similar expansion ports. As will be recognized by those of skill in the art, the video processing device is a device that is capable of processing audio/video data. In alternate implementations, the hardware device may be a device other than a video processing device.

The secret encryption key (SEK) may be a 128-bit key. In alternate implementations, the SEK may have a larger number of bits, such as 192 or 256 bits, or a smaller number of bits, such as 32 or 64 bits. Those of skill in the art will recognize that the number of bits may vary based on the level of security that is desired. In some implementations of the invention, the SEK may be a 128-bit, a 192-bit, or a 256-bit key that is compatible with the Advanced Encryption Standard (AES). Other encryption methods may be used as well.

In implementations of the invention, the SEK may be permanently embedded in the video processing device by way of a special fuse. For instance, the SEK may be written into a memory array of the video processing device over a write path that includes the special fuse. This special fuse may then be intentionally blown to prevent the SEK from being accessed or tampered with by external sources. The only remaining access to the SEK is internal to the video processing device and this internal access is unavailable to external sources in alternate implementations, the SEK may be hardwired into the register transfer level (RTL).

Figures 4, 4A:
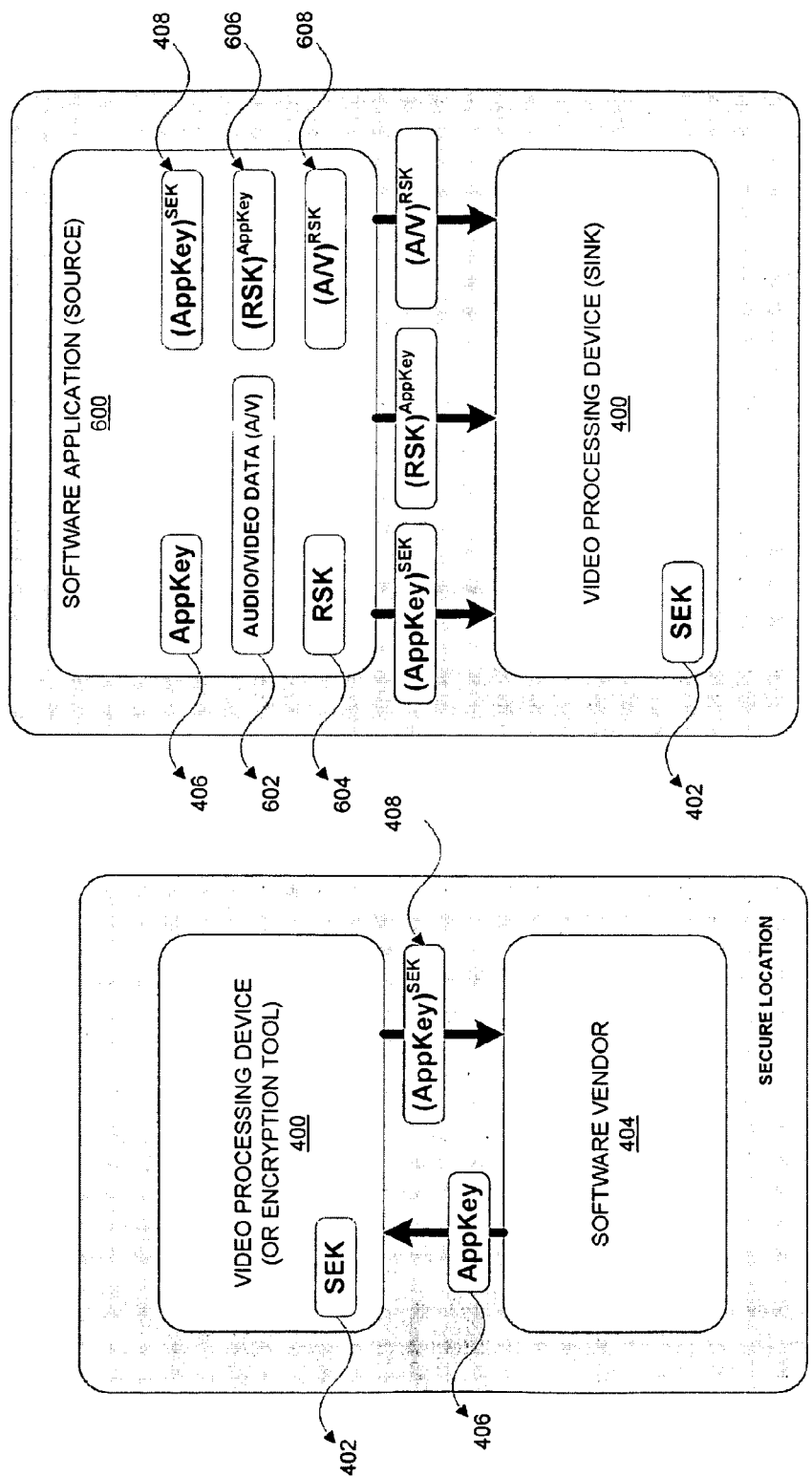
FIG. 4 is a block diagram illustrating the generation of a unique application key to be used for encrypting/decrypting data, according to an embodiment.
FIG. 4A is a block diagram illustrating the run-time authentication process and the establishing of the secure channel, according to an embodiment.

FIG. 4 graphically illustrates a video processing device 400 that includes an embedded SEK 402. The SEK 402 is permanently embedded within the video processing device 400 and may not be accessed or tampered with by external sources. As described above, the SEK 402 may be a 128, 192, or 256-bit key that may be used with AES or another cipher encryption process.

A unique application key (AppKey) 406 may be assigned to a software vendor. Each software vendor that produces a software application for use with the video processing device of the invention may be assigned a unique AppKey. No two software vendors will share the same AppKey. In some cases, a software vendor may be assigned two or more AppKeys. For instance, if the first AppKey is compromised, a second AppKey may be assigned. In some implementations, the AppKey is chosen by the software vendor. In alternate applications, the AppKey is generated by the manufacturer of the video processing device. In further implementations, the AppKey is chosen by an independent third party.

In some implementations of the invention, the AppKey may be a 128-bit key. In alternate implementations, the AppKey may have a larger number of bits, such as 192 or 256 bits, or a smaller number of bits, such as 32 or 64 bits. As will be explained below, in addition to being assigned to a software vendor, the AppKey will later serve as an encryption key. As such, the AppKey may be a 128-bit, a 192-bit, or a 256-bit key that is compatible with AES or an alternate cipher encryption process.

The unique AppKey may be encrypted using the SEK to generate an encrypted AppKey, designated herein as (AppKey)SEK 408. In some implementations, a block cipher encryption may be used. In further implementations of the invention, a standardized encryption such as AES may be used. AES is a specific block cipher that has been adopted as an encryption standard. As will be known to those of skill in the art, this block cipher may be used with the SEK to encrypt the AppKey. For instance, the AppKey 406 may be run through the block cipher encryption using the SEK 402 to output an encrypted (AppKey)SEK 408. In alternate implementations, ciphers other than AES may be used.

In some implementations, the encryption may be run on the video processing device itself. For example, the unique AppKey may be sent through the video processing device where it becomes encrypted with the SEK. In further implementations, a device that is not specifically a video processing device may be used to encrypt the unique AppKey. For instance, an encryption tool may be used to accept the unique AppKey and encrypt it with the SEK using AES in the same manner as a video processing device. The only requirement is that the SEK used in the encryption toll match the SEK that is permanently embedded in the numerous video processing devices sold to consumers. This enables each of the consumer-purchased video processing devices to decrypt the (AppKey)SEK using the AES block cipher and the SEK. In implementations of the invention, the encryption tool may consist of a computer that is running encryption software.

The encrypted AppKey, (AppKey)SEK, is then provided to the software vendor 404. The software vendor only has access to the AppKey and the (AppKey)SEK. The software vendor never has access to the SEK. Furthermore, because an encryption methodology such as AES may be used, the software vendor is unable to decipher the SEK even though it has access to both the AppKey and the (AppKey)SEK.

A software vendor 404 is shown interacting with the video processing device 400 during the initial provisioning of the encrypted application key (AppKey)SEK. As mentioned above, an encryption tool may be used in lieu of the video processing device. The software vendor 404 provides an AppKey 406 to the video processing device (or encryption tool) 400. Again, although FIG. 4 shows the AppKey 406 being provided by the software vendor 404, in alternate implementations it may be provided by the manufacturer of the video processing device 400 or an independent third party. The video processing device (or encryption tool) 400 encrypts the AppKey 406 using the SEK 402. An encryption methodology such as AES may be used for the encryption. The video processing device (or encryption tool) 400 then outputs an encrypted AppKey, represented as (AppKey)SEK 408, and this (AppKey)SEK 408 is provided to the software vendor 404.

The encrypting of the AppKey to generate the (AppKey)SEK may occur at a secure location. For instance, the provisioning phase may be carried out at the manufacturing facility where the video processing device is fabricated. In alternate implementations, the encryption tool may be provided to the software vendor who then maintains the encryption tool in a secure location and uses the tool to generate the encrypted AppKey. It is worth noting that this encryption process should not be carried out on generic user platforms for security purposes.

Figure 5:
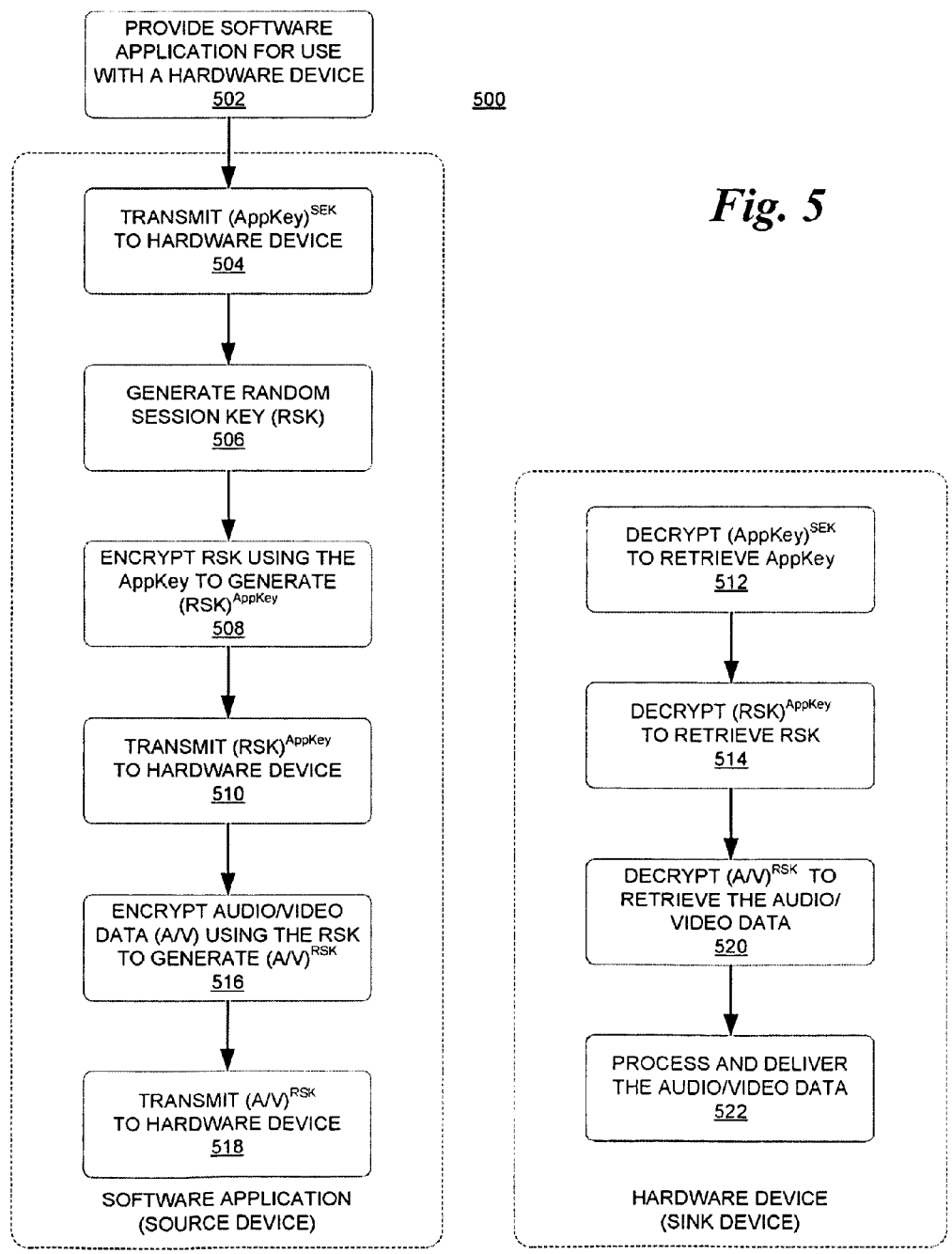
FIG. 5 is a flow diagram showing a run-time method for authenticating a hardware device and establishing a secure channel in accordance with an implementation of the invention.

FIG. 5 is a flow chart illustrating an exemplary run-time method 500 for authenticating a hardware device (i.e., a sink device), such as a video processing device, and establishing a secure channel between a software application (i.e., a source device) and the video processing device, in accordance with an implementation of the invention. FIG. 4A graphically illustrates the run-time authentication process and the establishing of the secure channel in accordance with an implementation of the invention. These two figures are discussed in parallel, below. As mentioned above, the secure channel is used to deliver audio/video data from the software application to the video processing device in a protected manner.

Starting with FIG. 5, a software application is provided by a software vendor for use with the video processing device (process 502 of FIG. 5). The software application is designed to at least partially process audio/video data. In accordance with implementations of the invention, embedded in the software application is the AppKey 406 that is unique to the software vendor. Furthermore, embedded in the software application is also the encrypted (AppKey)SEK 408, which consists of the AppKey after it was encrypted by the video processing device or an encryption tool using a SEK 402. An exemplary process for generating the (AppKey)SEK 408 for a particular software vendor has been described above.

Generally, the software application 600 protects the AppKey 406 and the (AppKey)SEK 408 using standard tamper resistance software methods that are known in the art. Conventional software applications generally use such methods for protecting license keys and audio/video data during processing. It should be noted that if the AppKey and the (AppKey)SEK are compromised, one would still be unable to determine the value of the SEK since an encryption methodology such as AES is used.

FIG. 4A illustrates a software application 600 and a video processing device 400. As described above, permanently embedded in the video processing device 400 is the SEK 402. Included in the software application 600 is the AppKey 406 that is unique to the software vendor and the encrypted (AppKey)SEK 408 that consists of the AppKey 606 after it has been encrypted using the SEK 402. The software application 600 also includes the audio/video data (A/V) 602 that needs to be securely transmitted to the video processing device 400.

At run-time, the software application and the video processing device are called on to process and deliver audio/video data. Prior to or concurrent with the transmission of the audio/video data, the software application transmits the (AppKey)SEK 408 to the video processing device 400 (at 504). Since the (AppKey)SEK is encrypted, it travels between the software application and the video Processing device in a highly protected manner that is nearly impossible to decode.

The software application may also generate a random session key (RSK) 604 (at 506). The RSK 604 is generally a unique key that is randomly generated by the software application and is not necessarily tied to any software vendor. A standard random number generation library may be used by the software application to generate the session key.

The software application then encrypts the RSK 604 using the AppKey 406 (at 508). This generates an encrypted (RSK) AppKey 606. As mentioned above, the AppKey 406 may be a 128, 192, or 256-bit key that is compatible with standard encryption methods. In one implementation, the encryption may be carried out using similar techniques as were used to encrypt the AppKey 406 with the SEK 402. For instance, a block cipher encryption such as AES may be used. The RSK 604 may be run through the block cipher encryption using the AppKey 406 to output an encrypted (RSK)AppKey 606. In other implementations, alternate methods of encrypting the RSK 604 with the AppKey 406 may be used.

Next, the software application transmits the encrypted (RSK)AppKey 606 to the video processing device 400 (at 510). The encrypted (RSK)AppKey 606 may be sent to the video processing device 400 around the same time as the encrypted (AppKey)SEK 408 or it may be sent at a later time. Generally, the software application will transmit both the encrypted (RSK)AppKey 606 and the encrypted (AppKey) SEK 408 at around the same time. As with the (AppKey)SEK 408, since the (RSK)AppKey 606 is encrypted, it travels between the software application and the video processing device in a highly protected manner that is nearly impossible to decode.

After receiving the encrypted (AppKey)SEK 408 from the software application 600, the video processing device 400 decrypts the (AppKey)SEK 408 using the SEK 402 that is permanently embedded within the video processing device 400 (at 512). The video processing device 400 has now retrieved the AppKey 406. The (AppKey)SEK 408 may be run through a block cipher decryption using the SEK 402 to output the decrypted AppKey 406. AES may be used as the decryption standard. The video processing device 400 therefore receives the AppKey 406 in a protected manner.

Next, after receiving the encrypted (RSK)AppKey 606 from the software application 600, the video processing device 400 decrypts the (RSK)AppKey 606 using the AppKey 406 that it previously decrypted (at 514). The video processing device has now retrieved the RSK 604. The encrypted (RSK)AppKey 606 may be run through a block cipher decryption using the AppKey 406 to output the decrypted RSK 604. Again, AES may be used as the decryption standard. The video processing device 400 therefore receives the RSK 604 in a protected manner. At this point in the process flow, the software application 600 and the video processing device 400 have a common shared RSK 604.

The software application 600 may now send encrypted audio/video data 608 to the video processing device 400 in a protected manner using the RSK 604. First, the software application 600 encrypts the audio/video data 602 using the RSK 604 (at 516). The encrypted audio/video data is referred to herein as (A/V)RSK 608. In one implementation, the encryption may be carried out using similar techniques as were used to encrypt the AppKey with the SEK and the RSK with the AppKey. In another implementation, electronic codebook (ECB) mode may be used for key encryption while counter (CTR) mode may be used for audio/video data encryption. It should be noted that for audio/video data encryption, any encryption mode available in the art may be used, including but not limited to any of the available variations of block cipher encryption techniques such as cipher-block chaining (CBC), propagating cipher-block chaining (PCBC), cipher feedback (CFB), and output feedback (OFB). The software application 600 then transmits the encrypted (A/V)RSK 608 to the video processing device 400 (at 51 8). As the audio/video data travels between the software application and the video processing device, the encryption prevents the (A/V)RSK 608 from being intercepted and decoded.

The video processing device receives the encrypted (A/V) RSK 608 and decrypts it using the RSK 604 it has previously decrypted (at 520). In one implementation, the decryption may be carried out using similar techniques as were used to decrypt the (AppKey)SEK and the (RSK)AppKey. The decryption method implemented here will be selected based on what is appropriate for the encryption method that was used on the audio/video data.

The video processing device has now retrieved the unencrypted audio/video data, which it may process and deliver (at 522). For instance, the video processing device may process the data and display the video on a display device while delivering the audio by way of a speaker.

The use of encryption protects the transmission of data. And because the video processing device cannot decrypt the AppKey or the RSK without prior possession of the SEK, the hardware is implicitly authenticated. Hardware without the SEK cannot decrypt any of the data and therefore cannot process and deliver the audio/video data.

FIG. 4A illustrates the flow of encrypted data between the software application 600 and the video processing device 400, as discussed above. As shown, the software application transmits the (AppKey)SEK 408 to the video processing device 400. The software application 600 also generates a random session key RSK 604, encrypts the RSK 604 with the AppKey 406 to generate (RSK)AppKey 606, and transmits (RSK)AppKey 606 to the video processing device 400. Finally, the software application 600 encrypts the A/V 602 with the RSK 604 to generate encrypted audio/video data (A/V)RSK 608, and transmits (A/V)RSK 608 to the video processing device 400. As shown in FIG. 4A, all of the data that flows from the software application 600 to the video processing device 400 is encrypted.

As described above, a goal for PAVP hardware is to create a hardware mechanism to securely play video content that was previously recorded on a storage device. FIG. 1B is a block diagram illustrating how PAVP techniques, as discussed above, may be used to ensure that the sensitive data or video content is not available in the clear as it moves between secure storage and graphics engine on platforms configured with VT architecture, according to an embodiment of the invention. An embodiment of the invention utilizes a COS 160 and a SOS 170 to further protect the content from malware, in a VT capable platform.

For purposes of illustration, the PAVP architecture was discussed above using an example of playing video content. For purposes of illustration below, embodiments of the invention are discussed in the context of displaying sensitive data on a display screen. In either case, the PAVP architecture and session keys allow encrypted video or display content to be safeguarded against mal-ware or misuse.

In an embodiment, an application 171, for instance a secure browser, may be used to securely interact with a user's financial institution. The application 171 is launched in a separate virtual machine (VM) in the SOS 170. Thus, all data accessed by the process (browser) is restricted to processes within the VM. A small portion of the application, typically limited to a user interface remains in the COS to interact with the SOS application 171 via a COS proxy application 161. Once data is received by the application 171, the application performs an encryption/decryption key exchange, as discussed above, with the hardware 103b as part of the PAVP architecture. This key exchange is made by the SOS 170 via the COS proxy application 161. At no time does the COS, or user environment ever actually hold a plain text key. Now, encrypted data may be sent from the application 171 to the graphics hardware 103b via the graphics driver 163.

The storage device 105b stores data in an encrypted form in the protected area 106b. Without having access to the decryption keys, the data cannot be read from the storage device 105b. The COS application 161 does not have the key to decrypt this data. However, the COS application 161 has knowledge that the data exists and can locate it. The COS application 161 may read this encrypted data from the storage device 105b (from the protected area 106b) and send the encrypted data to the PAVP hardware (graphics engine) 103b. The PAVP hardware performs decryption on the sensitive data based on a session key exchanged between an SOS application and the graphics hardware 103b. The decryption key is maintained inside the decryption engine present inside the graphics display pipeline. The decrypted data is stored inside a portion of memory isolated from the COS. Hence the data is not visible to any mal-ware running inside COS. The data is presented to the secure Sprite overlay 123b which in turn displays the unencrypted data on the display 120b. Thus, at no point in time is clear text data visible to the COS based applications.

Figure 2:
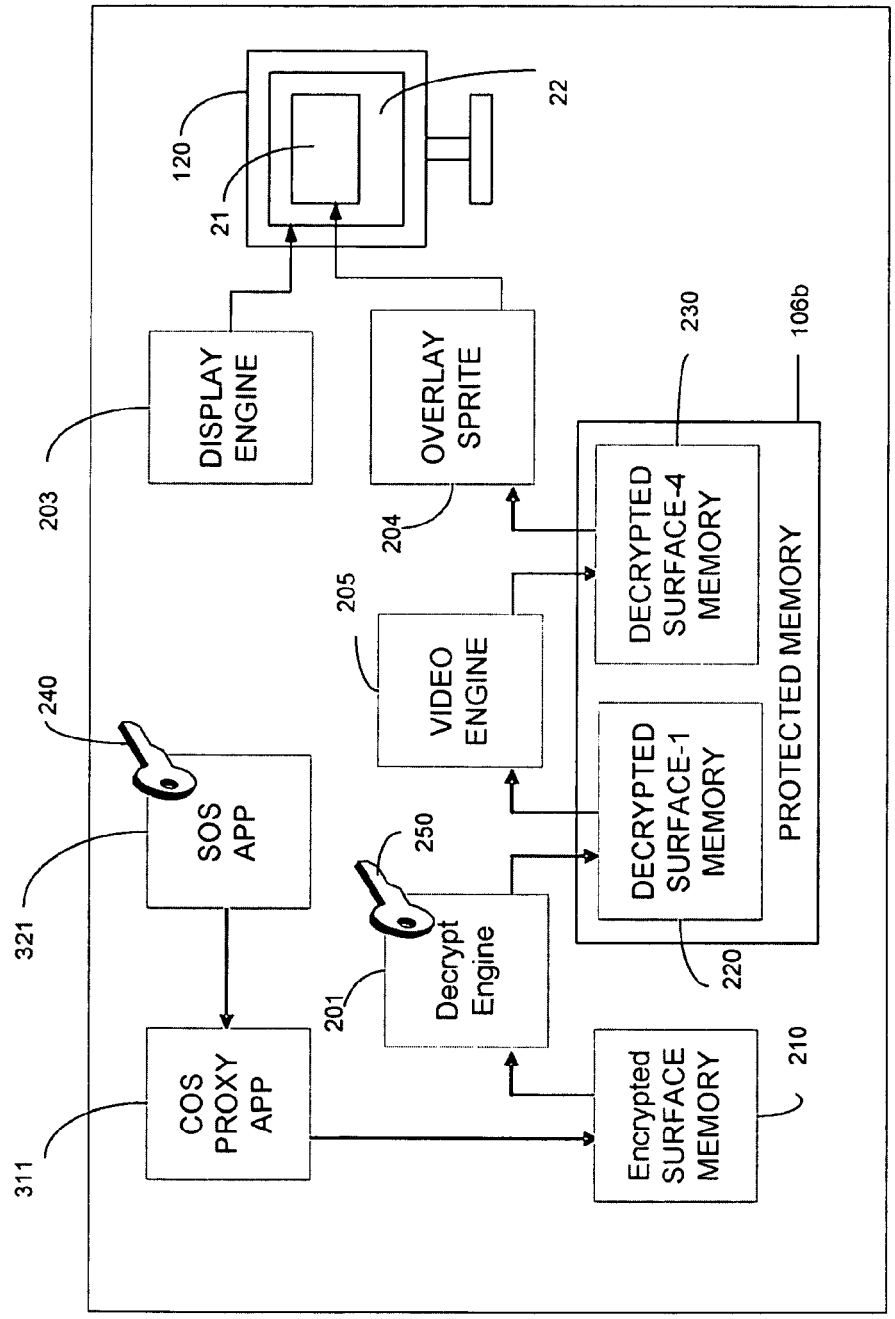
FIG. 2 is a block diagram illustrating the encryption and decryption of sensitive data, according to an embodiment of the invention.
Figure 6:
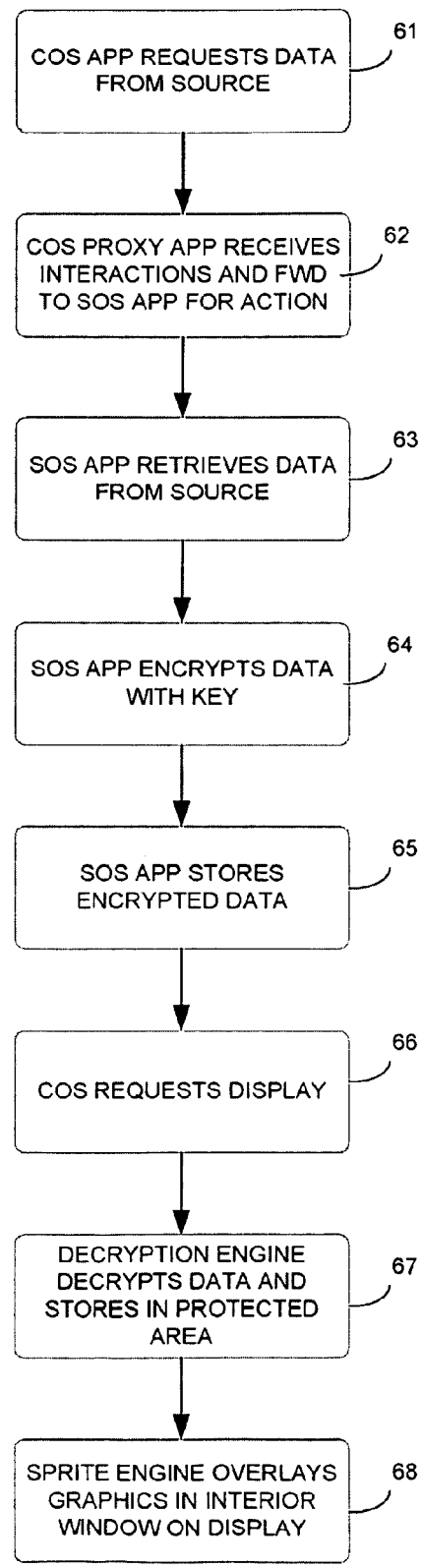
FIG. 6 is a flow diagram showing an exemplary secure method for retrieving and displaying data using virtualization technology, according to an embodiment of the invention.

Referring now to FIG. 2, there is shown a block diagram illustrating the protection of content throughout the platform, according to an embodiment of the invention. FIG. 6 is a flow diagram illustrating an exemplary method for retrieving and displaying the sensitive data. FIGS. 2 and 6 will discussed in parallel, below. The platform has protected memory 106b to hold buffers containing data to be displayed by the display engine, on a display monitor 120. Decrypted surface-1 memory 220 represents a first buffer of memory and decrypted surface-4 memory 230 represents a second buffer of memory. A user interacts with the COS application 311 (at 61). User invocation, for instance, of a secure browser, causes a SOS application 321 and COS proxy application 311 to be launched. The user interacts with a small piece of the secure browser running in the COS. The bulk of the secure browser runs in the SOS VM, where the data may be processed securely, away from malicious software. Only the user interface portion runs in the COS. Thus, the COS application is simply providing a service (to the SOS application) by making the appropriate requests to get the data displayed by the graphics engine.

The COS proxy application 311 receives the interaction requests and forwards the information to the SOS application 321 for action (at 62). A mouse click, for instance, is sent by the proxy application 311 in the COS to the SOS application 321 at (62). The SOS application 321, may now determine the action to be taken based on the location of the user action (for instance, respond to a user selection and retrieve data from a remote server belonging to a financial institution). The SOS application 321 retrieves the sensitive data from the source (at 63). The SOS application 321 is responsible for storing data received from the network source (i.e., financial institution web site) into memory. When the data is received, the SOS application 321 encrypts the data using key 240 (at 64) and stores the encrypted data in the encrypted surface memory buffer 210 (at 65). The VMM will have set up areas of memory 210 to be shared by both the COS and SOS VMs.

The COS proxy application 311 directs the graphics hardware to access the encrypted data in memory 210 (at 66). The COS application 311 does not have the key to the encrypted data, so applications running in the user environment do not have access to the data. Thus, the data remains secure. The decryption engine 201 is part of the graphics hardware, and has the key 250 to decrypt the data stored in the buffer 210. The decryption engine 201 retrieves the encrypted data 210 and decrypts it (at 67). The decrypted data is then stored in protected memory 106b in the buffer 220. The video engine 205 may perform further processing of the data. Once the data is ready to be displayed, it is stored in decrypted surface-4 memory buffer 230. The Sprite overlay 204 is directed to display the data in buffer 230 to the display monitor 120 (at 68). Thus, it may be seen that decrypted, sensitive data may be accessed only by the higher privileged SOS application 321 and the graphics and display hardware engines (201, 205, 204). Unprotected data may be displayed with the display engine 203, for instance, in an exterior window 22 on the monitor 120. Protected data may be displayed in the interior window 21 on the display monitor 120.

Referring again to FIG. 1A, while the PAVP architecture provides greater protection for sensitive data, the protection may be limited. Since a single OS is running on the platform 101, malicious code running in the OS may be able to gain access to the unencrypted memory buffer. Embodiments of the invention using the virtual appliance (e.g., VM) model are less likely to be subject to mal-ware because the OS and other applications running in the user environment (e.g., user or COS VM) have no access to the data because none of these processes have the key to the encrypted data. Further, the VMM or hardware constructs may be used to partition the memory so that the COS VM has no physical access to the memory buffer 106b that holds the unencrypted data.

Figure 3:
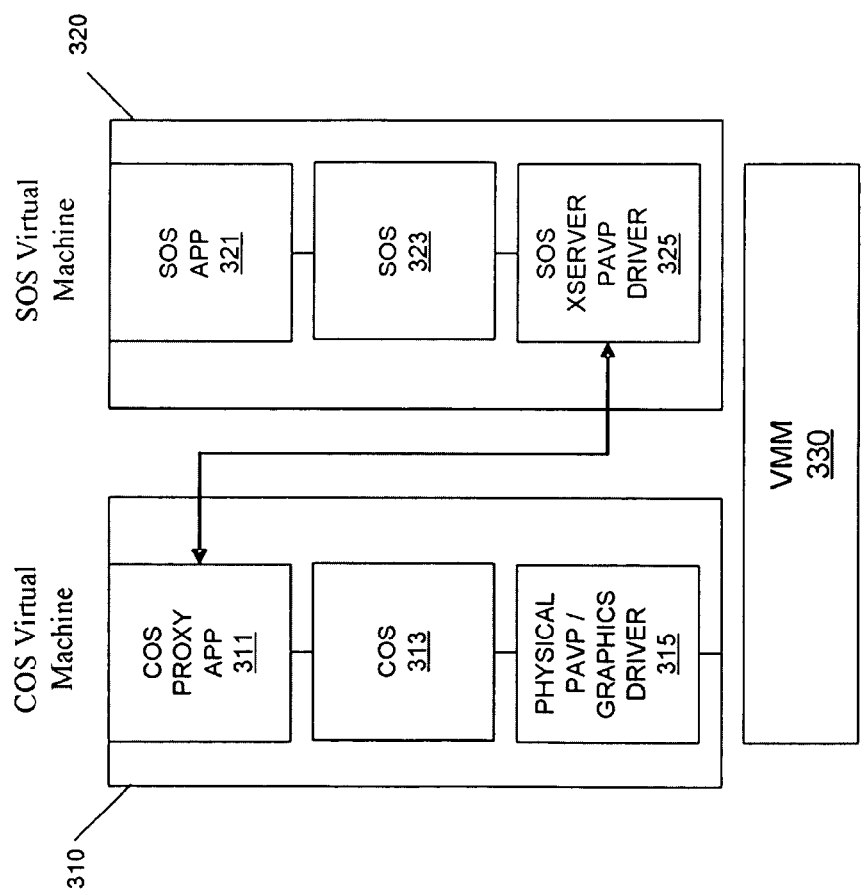
FIG. 3 is a block diagram illustrating the interaction between the capability operating system and the service operating system, according to an embodiment of the invention.

Referring now to FIG. 3, there is shown a block diagram illustrating information exchange between the COS and SOS, according to an embodiment of the invention. In this illustration, the platform has a virtual machine monitor (VMM) 330 to control operation of the virtual machines. A capability operating system (COS) 313 is to be launched in a first virtual machine 310. In this VM 310, the browser application 311 may be launched. In an embodiment, the COS requires access to the physical graphics device, for optimum performance. Thus, in this case, the physical graphics driver (PAVP enabled) 315 operates in this VM 310. A service operating system (SOS) 323 executes in a second VM 320. The SOS may provide various OS services, allocate memory and the like.

For instance, referring again to FIG. 1B, the SOS 170 may control a voice over IP (VoIP) application 171 which has an audio driver 173. The VMM 180 controls operation of the COS 160 and SOS 170.

The SOS VM 320 has a virtualized graphics driver (PAVP-enabled) 325. When applications or processes outside of the COS require access to the graphics hardware, access is enabled via the SOS PAVP driver 325. Access to the physical graphics driver 315 is made via communication between the virtualized graphics driver 325 and the COS proxy application 311. Implementations of the present invention have the physical graphics driver owned by the COS to optimize OS access to the physical device. For instance, the COS may be a Windows® OS which operates best when able to access the physical graphics device to display multiple windows and graphics. Other applications on the platform communicate their graphics needs via the virtualized graphics driver in the SOS VM 320. Other drivers and physical devices may be controlled by the SOS VM 320.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or nonvolatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be arranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for securing data, comprising:
a platform having virtualization technology (VT) capabilities;
a virtual machine monitor configured to control operation of virtual machines on the platform and separate and distinct from any virtual machines under its control;
a capability operating system (COS) to be run in a first virtual machine on the platform, the first virtual machine under control of the virtual machine monitor, an application running under the COS to request data from a source;
a service operating system (SOS) to be run in a second virtual machine on the platform, the second virtual machine under control of the virtual machine monitor, the SOS configured to retrieve the requested data from the source and to encrypt the data before storing the encrypted data in a first memory store, the first memory store being accessible to the COS; and
a graphics engine having decryption capabilities and having access to the first memory store and a protected second memory store, the second memory store to store decrypted data, and the second memory store being inaccessible to the first and second virtual machines.

2. The system as recited in claim 1, further comprising a display monitor, wherein the graphics engine displays the retrieved data on the display monitor after decrypting the stored encrypted data.

3. The system as recited in claim 2, wherein the graphics engine is to combine the decrypted data with other display data on the display monitor.

4. The system as recited in claim 1, wherein the SOS further comprises a virtualized graphics driver for accessing the graphics engine via a physical graphics driver running on the COS.

5. The system as recited in claim 1, wherein the graphics engine has a secret encryption key and the SOS has a unique application key, wherein the unique application key is to he encrypted with the secret encryption key to result in an encrypted application key for use with the graphics engine.

6. The system as recited in claim 1, wherein the graphics engine is to negotiate with the SOS to utilize a session key for decrypting data encrypted by the SOS.

7. The system as recited in claim 1, wherein the SOS comprises a plurality of system services and controls one or more devices other than the graphics engine.

8. A method for securing data, comprising:
   requesting data from a source by a first application running in a first virtual machine on a platform having virtualization technology architecture, the first virtual machine being under control of a virtual machine monitor and executing a capability operating system (COS) to control a user environment;
   intercepting the request for data by a second application running in a second virtual machine, the second virtual machine being under control of the virtual machine monitor and executing a service operating system (SOS), wherein the virtual machine monitor is separate and distinct from both the first virtual machine and the second virtual machine;
   retrieving the requested data from the source by the second application;
   encrypting the retrieved data, by the second application;
   storing the encrypted data in a first memory store accessible to the first application and to a graphics engine;
   decrypting the encrypted data, by the graphics engine, responsive to a request to display the requested data, by the first application;
   storing the decrypted data in a protected second memory sto , the COS having no access to the second memory store; and
   displaying the requested data on a display monitor by the graphics engine.

9. The method as recited in claim 8, further comprising:
   combining other data to display, the other data generated by a display engine, with the requested data decrypted by the graphics engine to form a combined display area to be displayed on the display monitor.

10. The method as recited in claim 8, wherein the graphics engine further comprises an encryption/decryption engine conforming to an Advanced Encryption Standard (AES) and a Sprite overlay engine to display the requested data in an interior window on the display monitor.

11. The method as recited in claim 8, further comprising:
    negotiating between the second application and the graphics engine via a. physical graphics driver running on the first virtual machine to generate a session key.

12. Anon-transitory machine-readable storage medium having instructions stored thereon for securing data, that when executed on a platform, cause the platform to:
    request data. from a source by a first application running in a. first virtual maehine on a platform having virtualization technology architecture, the first virtual machine being under control of a virtual machine monitor and executing a capability operating system (COS) to control a user environment;
    intercept the request for data by a second application running in a second virtual machine, the second virtual machine being under control of the virtual machine monitor and executing a service operating system (SOS), wherein the virtual machine monitor is separate and distinct from both the first virtual machine and the second virtual machine˙,
    retrieve the requested data from the source by the second application;
    encrypt the retrieved data, by the second application;
    store the encrypted data in a first memory store accessible to the first application and to a graphics engine;
    decrypt the encrypted data, by the graphics engine, responsive to a request to display the requested data, by the first application;
    store the decrypted data in a protected second memory store, the COS having no access to the second memory store; and
    display the requested data on a display monitor by the graphics engine.

13. The non-transitory machine-readable storage medium as recited in claim 12, further comprising instructions to:
    combine other data to display, the other data generated by a display engine, with the requested data decrypted by the graphics engine to form a combined display area to be displayed on the display monitor.

14. The non-transitory machine-readable storage medium as recited in claim 12, wherein the graphics engine further comprises an encryption/decryption engine conforming to an Advanced Encryption Standard (AES) and a Sprite overlay engine to display the requested data in an interior window on the display monitor.

15. The non-transitory machine-readable storage medium as recited in claim 12, further comprising instructions to:
    negotiate between the second application and the graphics engine via a physical graphics driver running on the first virtual machine to generate a session key.

* * * * *